(12) United States Patent
Neff et al.

(10) Patent No.: US 7,676,064 B2
(45) Date of Patent: Mar. 9, 2010

(54) SENSOR SCAN PLANNER

(75) Inventors: Michael G. Neff, Lake St. Louis, MO (US); Shirley N. Cheng, Richmond Heights, MO (US); Chang-Shaung R. Lee, Town and Country, MO (US); Ted L. Johnson, Florissant, MO (US)

(73) Assignee: The Boeing Company, Chicago, IL (US)

( * ) Notice: Subject to any disclaimer, the term of this patent is extended or adjusted under 35 U.S.C. 154(b) by 937 days.

(21) Appl. No.: 11/383,900

(22) Filed: May 17, 2006

(65) Prior Publication Data

US 2007/0269077 A1    Nov. 22, 2007

(51) Int. Cl.
 *G06K 9/00* (2006.01)
(52) U.S. Cl. ...................................... 382/103
(58) Field of Classification Search ................ 382/103, 382/104; 348/169; 701/202
See application file for complete search history.

(56) References Cited

U.S. PATENT DOCUMENTS

| 3,799,676 | A | 3/1974 | Chatterton | |
|---|---|---|---|---|
| 5,672,872 | A | 9/1997 | Wu et al. | |
| 5,809,171 | A | 9/1998 | Neff et al. | |
| 5,890,808 | A | 4/1999 | Neff et al. | |
| 5,946,422 | A | 8/1999 | Neff et al. | |
| 5,982,930 | A | 11/1999 | Neff et al. | |
| 5,982,945 | A | 11/1999 | Neff et al. | |
| 6,577,947 | B1 * | 6/2003 | Kronfeld et al. | 701/202 |
| 7,450,735 | B1 * | 11/2008 | Shah et al. | 382/103 |
| 2003/0222789 | A1 | 12/2003 | Polyakov | |
| 2004/0006424 | A1 | 1/2004 | Joyce et al. | |
| 2006/0058954 | A1 | 3/2006 | Haney | |

FOREIGN PATENT DOCUMENTS

| EP | 1262789 | 12/2002 |
|---|---|---|
| EP | 1293925 | 3/2003 |
| GB | 2330801 | 5/1999 |
| JP | 2004325165 | 11/2004 |
| WO | WO2004084136 | 9/2004 |

OTHER PUBLICATIONS

Blake, et al., "Data Fusion for Visual Tracking With Particles", Proceedings of the IEEE, New York, vol. 92, No. 3, Mar. 2004, pp. 495-513.
Cohen, et al., "Detecting and Tracking Moving Objects for Video Surveillance", Computer Vision and Pattern Recognition, IEEE conference, vol. 2, Jun. 23, 1999, pp. 319-325.
Yalcin, et al., "A Flow-Based Approach to Vehicle Detection and Background Mosaicking in Airborne Video", Technical Reports, Mar. 2005, pp. 1-15.
Efe, et al., "A Tracking Algorithm For Both Highly Maneuvering and Nonmaneuvering Targets", Proceedings of the 36th Conference on Decision & Control, San Diego, CA, Dec. 10, 1997, vol. 4, pp. 3150-3155.

* cited by examiner

*Primary Examiner*—Tom Y Lu (57) ABSTRACT

Sensor scan planner methods and systems are described. In an embodiment, a sensor scan schedule can be generated by a sensor scan schedule generator to optimize the scan schedules of multiple sensors based on optimal capabilities of each sensor and autonomous target recognition algorithm processing. A search manager can then assign an evaluation criteria value to the generated sensor scan schedule based on sensor scan schedule evaluation criteria, and compare the evaluation criteria value to other evaluation criteria values corresponding to respective previously generated sensor scan schedules to determine an optimal sensor scan schedule. The search manager can then determine whether to generate additional sensor scan schedules and assign additional evaluation criteria values for comparison to determine the optimal sensor scan schedule.

20 Claims, 9 Drawing Sheets

SENSOR SCAN PLANNER

CROSS REFERENCE TO RELATED APPLICATIONS

This patent application is related to the following co-pending, commonly-owned U.S. Patent Applications: U.S. patent application Ser. No. 11/383,914 entitled "METHODS AND SYSTEMS FOR THE DETECTION OF THE INSERTION, REMOVAL, AND CHANGE OF OBJECTS WITHIN A SCENE THROUGH THE USE OF IMAGERY" filed on May 17, 2006 U.S. patent application Ser. No. 11/383,911 entitled "MOVING OBJECT DETECTION" filed on May 17, 2006 U.S. patent application Ser. No. 11/383,907 entitled "ROUTE SEARCH PLANNER" filed on May 17, 2006; and U.S. patent application Ser. No. 11/383,919 entitled "METHODS AND SYSTEMS FOR DATA LINK FRONT END FILTERS FOR SPORADIC UPDATES" filed on May 17, 2006, which applications are incorporated herein by reference.

TECHNICAL FIELD

The present disclosure relates to sensor scan planner.

BACKGROUND

In a conflict environment, the search for relocatable military targets (e.g. moving, or movable targets) typically involves flying one or more airborne weapon systems, such as missiles or other unmanned armaments, into a large area where one or more sensors on each of the weapon systems scan regions of the target area. Prior to deploying an airborne weapon system, it may be programmed with a set of flight path waypoints and a set of sensor scan schedules to enable an on-board guidance and targeting system to conduct a search of the target area in an effort to locate new targets, or targets that may have been previously identified through reconnaissance efforts.

Due to the similar appearance of relocatable targets to other targets and objects within a target area, typical weapon system designs utilize autonomous target recognition algorithm(s) in an effort to complete mission objectives. However, these autonomous target recognition algorithm(s) do not provide the required optimal performance necessary for adaptive relocatable target locating, scanning, and/or detecting.

SUMMARY

In an embodiment of sensor scan planner, a sensor scan schedule can be generated by a sensor scan schedule generator to optimize the scan schedules of multiple sensors based on optimal capabilities of each sensor and autonomous target recognition algorithm processing. A search manager can then assign an evaluation criteria value to the generated sensor scan schedule based on sensor scan schedule evaluation criteria, and compare the evaluation criteria value to other evaluation criteria values corresponding to respective previously generated sensor scan schedules to determine an optimal sensor scan schedule. The search manager can then determine whether to generate additional sensor scan schedules and assign additional evaluation criteria values for comparison to determine the optimal sensor scan schedule.

In another embodiment of sensor scan planner, a sensor scan planner system is implemented as a computing-based system of an airborne platform or weapon system. Probability maps can be generated from previous sensor scans of a target area combined with a projected target location of relocatable targets in the target area. Sensor scan schedules can then be generated to optimize scan schedules of multiple sensors on the airborne platform or weapon system to search for at least one of the relocatable targets. The sensor scan schedules can be generated based at least in part on the probability maps, and can be evaluated based on sensor scan schedule evaluation criteria.

BRIEF DESCRIPTION OF THE DRAWINGS

Embodiments of sensor scan planner are described with reference to the following drawings. The same numbers are used throughout the drawings to reference like features and components.

DETAILED DESCRIPTION

Sensor scan planner is described to adaptively develop future sensor scan schedules which are intended to maximize the probability of accomplishing the mission of aircraft such as an unmanned aerial vehicle (UAV), an airborne weapon system such as a missile or other unmanned armament, or any other suitable airborne platforms. Alternatively, embodiments of sensor scan planner may be configured for use with non-aircraft platforms such as land-based vehicles, exo-atmospheric vehicles, and any other suitable platforms. Thus, in the following description, references to "an airborne weapon system" or to "an airborne platform" should not be construed as limiting.

As a component of a larger system, sensor scan planner functions in real-time to provide the best determinable sensor scan schedule to facilitate accomplishing a mission according to pre-determined commit criteria for the aircraft, airborne weapon system, non-aircraft platform or other mobile platform. The larger, controlling system can generate a synchronization event to initiate the generation of new and/or modified sensor scan schedules dynamically and in real-time, such as after an unmanned aerial vehicle or airborne weapon system has been launched and is enroute or has entered into a target area.

The sensor scan planner system can optimize weapons systems, reconnaissance systems, and airborne platform capabilities given the current performance of autonomous target recognition algorithms. The description primarily references "relocatable targets" because the performance of current fixed or stationary target acquisition algorithms is sufficient to meet the requirements of a pre-planned fixed target airborne platform design. However, the systems and methods described herein for sensor scan planner can be utilized for fixed targeting updates, such as for verification of previous reconnaissance information prior to committing to a target.

Sensor scan planner methods and systems are described in which embodiments provide for generating adaptive sensor scan schedules to optimize the scan schedules of multiple, various sensors and to coordinate scanned image data processing with multiple processors on an airborne platform, aircraft, or airborne weapon system to search for and locate relocatable targets and, ultimately, to maximize the probability of mission accomplishment. Sensor scan planner develops new or modified sensor scan schedules according to the scan pattern capabilities of a sensor scan schedule generator, and each sensor scan schedule is then evaluated based on sensor scan schedule evaluation criteria which includes sensor performance, the performance of autonomous target recognition algorithms, and the commit criteria defined for a particular airborne platform system.

While features and concepts of the described systems and methods for sensor scan planner can be implemented in any number of different environments, systems, and/or configurations, embodiments of sensor scan planner are described in the context of the following exemplary environment and system architectures.

Figure 1:
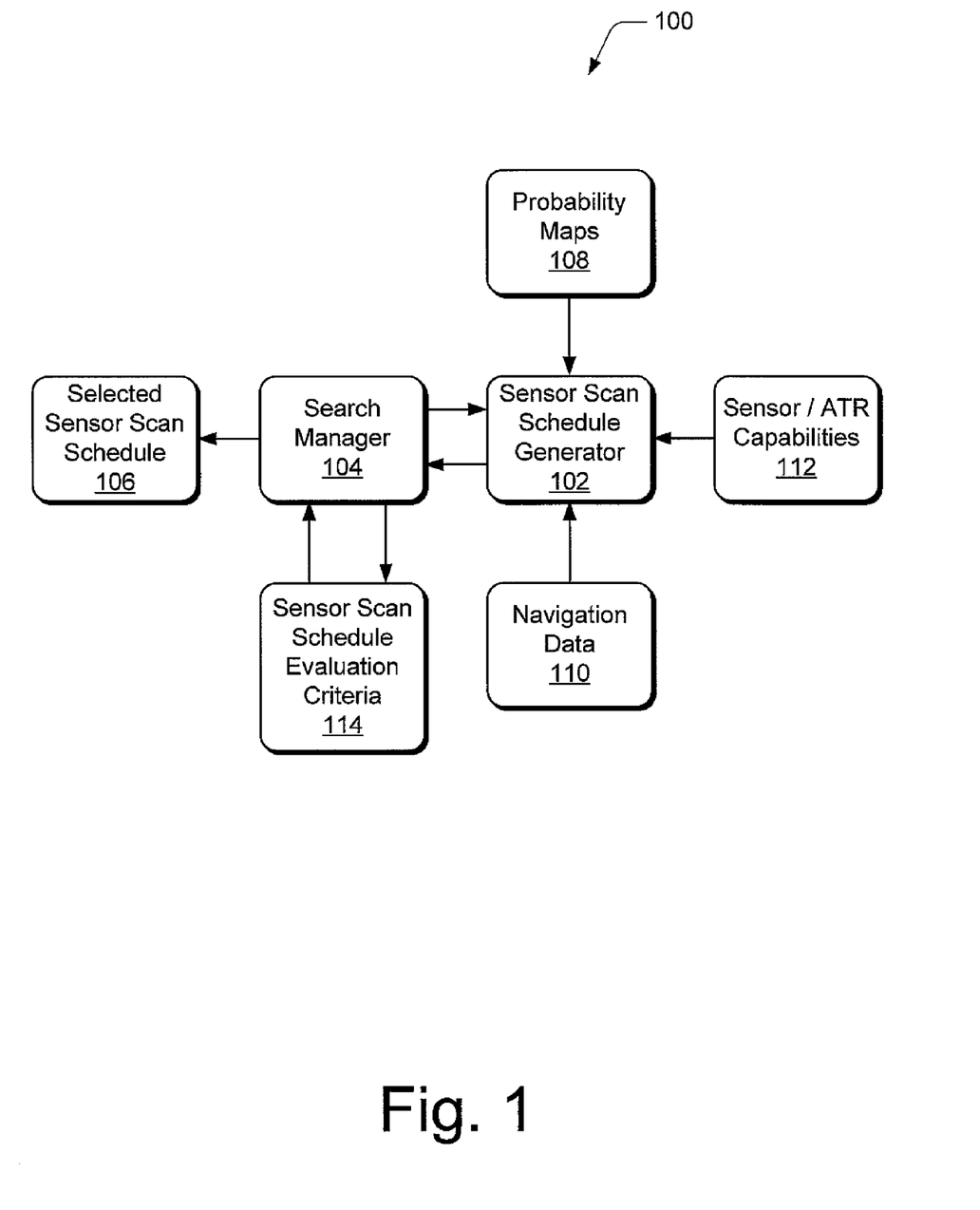
FIG. 1 illustrates an exemplary sensor scan planner system in which embodiments of sensor scan planner can be implemented.

FIG. 1 illustrates an exemplary sensor scan planner system 100 in which embodiments of sensor scan planner can be implemented. The sensor scan planner system 100 generates sensor scan schedules to optimize the scan schedules of multiple, various sensors and to coordinate scanned image data processing with multiple processors on an airborne platform or weapon system to maximize the probability of mission accomplishment given the current system capabilities.

The system 100 includes a sensor scan schedule generator 102 and a search manager 104. To generate a selected sensor scan schedule 106, the sensor scan schedule generator 102 utilizes probability maps 108 and navigation data 110, as well as sensor and autonomous target recognition (ATR) capabilities 112. The search manager 104 utilizes sensor scan schedule evaluation criteria 114 to compare and determine the contribution of a generated sensor scan schedule towards accomplishing the mission of an airborne platform or weapon system. In an embodiment, the sensor scan planner system 100 can be implemented as components of a larger system which is described in more detail with reference to FIG. 2.

The probability maps 108 can be generated, at least in part, from previous sensor scans of a region in a target area combined with projected target locations (also referred to as "projected object states") of relocatable targets in the target area. The relocatable targets can be moving or movable military targets in a conflict region, for example. Probability maps 108 are described in more detail with reference to FIG. 2 and FIG. 6. The navigation data 110 provides the system platform three-dimensional position, attitude, and velocity to the sensor scan schedule generator 102.

The sensor and ATR capabilities 112 contributes sensor and ATR performance model inputs to the sensor scan schedule generator 102, and define the optimal capabilities of each sensor and autonomous target recognition algorithm used to process the sensor scan images to identify and locate the relocatable targets. The sensor scan schedule generator 102 can determine which combination of sensors and multiple processors for the autonomous target recognition algorithms, as well as which sequence of sensor scans, provide an optimization for the greatest likelihood of target detection.

The search manager 104 can initiate the sensor scan schedule generator 102 to generate a new or modified sensor scan schedule based at least in part on a probability map 108, navigation data 110, and/or the sensor and ATR capabilities 112. The sensor scan schedule generator 102 generates the sensor scan schedule to scan and/or search for the relocatable targets, and generates the sensor scan schedule based on the optimal capabilities of each sensor and the associated autonomous target recognition algorithm processing. The sensor scan schedule optimizes the sensor scan schedules and/or patterns of the multiple sensors along a current velocity vector of the airborne platform or weapon system to search and locate a relocatable target.

The search manager 104 can then assign an evaluation criteria value to a generated sensor scan schedule based on the sensor scan schedule evaluation criteria 114. The search manager 104 can compare the evaluation criteria value to other evaluation criteria values corresponding to respective previously generated sensor scan schedules to determine an optimal sensor scan schedule. The search manager 104 can also determine whether to generate additional sensor scan schedules and assign additional evaluation criteria values for comparison to determine the optimal sensor scan schedule. In an embodiment, the search manager 104 can compare the generated sensor scan schedule to the sensor scan schedule evaluation criteria 114 and determine whether the generated sensor scan schedule meets (to include exceeds) a conditional probability threshold, or similar quantifiable metric, based on the sensor scan schedule evaluation criteria 114. The conditional probability threshold or quantifiable metric may include, for example, a likelihood of locating a relocatable target if the airborne platform or weapon system is then initiated to scan for the target according to the sensor scan schedule.

The sensor scan schedule evaluation criteria 114 can include commit logic that indicates whether to commit the airborne platform or weapon system to a target once identified. The search manager 104 can continue to task the sensor scan schedule generator 102 to modify or generate additional sensor scan schedules until an optimal sensor scan schedule for mission accomplishment is determined, and/or reaches an exit criteria which may be a threshold function of the sensor scan schedule evaluation criteria, a limit on processing time, or any other type of exit criteria.

The sensor scan schedule generator 102 can be implemented as a modular component that has a defined interface via which various inputs can be received from the search manager 104, and via which generated sensor scan schedules can be communicated to the search manager 104. As a modular component, the sensor scan schedule generator 102 can be changed-out and is adaptable to customer specific needs or other implementations of sensor scan schedule generators. For example, a sensor scan schedule generator 102 can include various combinations of sensor and processor partitioning to process sensor scan images with different autonomous target recognition algorithms. Additionally, different sensor scan schedule generators can include different implementations of sensor scan patterns that correspond to the capabilities of the multiple sensors on an airborne platform or weapon system.

Figure 2:
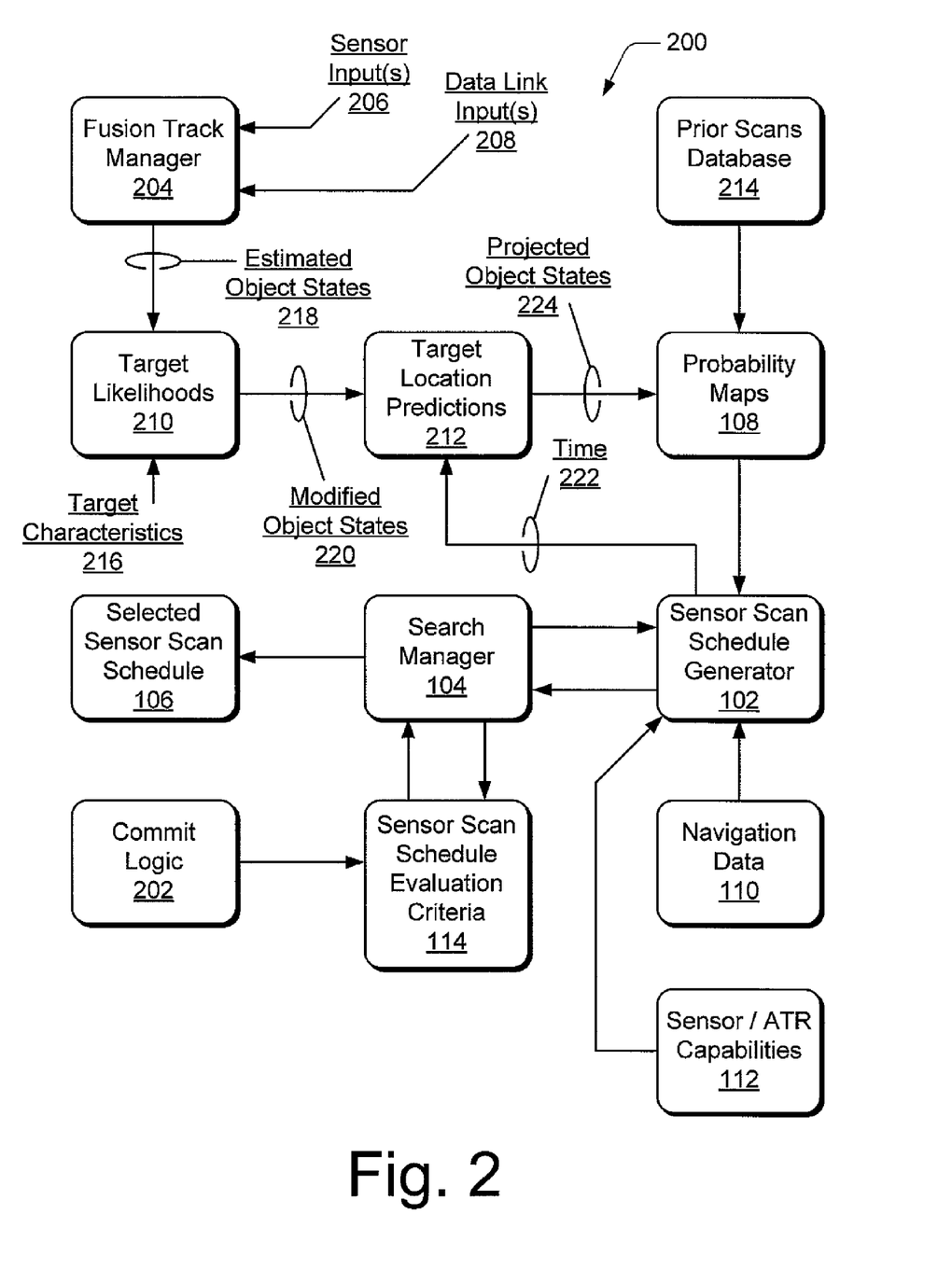
FIG. 2 illustrates an exemplary environment in which embodiments of sensor scan planner can be implemented.

FIG. 2 illustrates an exemplary environment 200 in which embodiments of sensor scan planner can be implemented to determine the selected sensor scan schedule 106. The environment 200 includes the components of the sensor scan planner system 100 (FIG. 1), such as the sensor scan schedule generator 102, the search manager 104, the probability maps 108, the navigation data 110, the sensor and ATR capabilities 112, and the sensor scan schedule evaluation criteria 114. The environment 200 also includes commit logic 202 by which to determine whether to commit a weapon system to a target.

The commit logic 202 includes pre-determined commit criteria for a weapon system, and in a simple example, the commit logic 202 may indicate to commit to a target of type A before committing to a target of type B, and if a target of type A cannot be located or identified, then commit to a target of type B before committing to a target of type C, and so on. The search manager 104 can utilize the sensor scan schedule evaluation criteria 114, the commit logic 202, and the sensor and ATR capabilities 112 when a sensor scan schedule is generated to determine the contribution of a generated sensor scan schedule towards accomplishing the mission of an airborne platform or weapon system.

The environment 200 also includes a fusion track manager 204 that receives various targeting inputs as sensor input(s) 206 and data link input(s) 208 which are real-time data and platform or weapon system inputs. The sensor input(s) 206 can be received as ATR algorithm processed imaging frames generated from the various sensors on an airborne platform or weapon system, such as IR (infra-red) images, visual images, laser radar or radar images, and any other type of sensor scan and/or imaging input. The data link input(s) 208 can be received as any type of data or information received from an external surveillance or reconnaissance source, such as ground-based target coordinate inputs, or other types of communication and/or data inputs.

The environment 200 also includes target likelihoods 210, target location predications 212, and a prior scans database 214. The target likelihoods 210 are determined based on target characteristics 216 and estimated object states 218 received from the fusion track manager 204. The target location predictions 212 are determined based on modified object states 220 generated from target likelihoods 210, and based on a future time input 222 received from the sensor scan schedule generator 102.

The target location predictions 212 transforms the modified object states 220 into projected object states 224 at the future time 222 provided by the sensor scan schedule generator 102. The prior scans database 214 maintains parameters from previous sensor scans of regions in a target area. The prior scans database 214 provides the parameters from the previous sensor scans to the probability maps 108. The probability maps 108 combine the projected object states 224 and the parameters from the previous sensor scans from the prior scans database 214 to generate a probability map 108.

The fusion track manager 204 is described in more detail with reference to the example shown in FIG. 3. The target likelihoods 210 and the target location predications 212 are described in more detail with reference to the example shown in FIG. 4. The prior scans database 214 is described in more detail with reference to the example shown in FIG. 5, and the probability maps 108 are described in more detail with reference to the examples shown in FIG. 6. Additionally, any of the environment 200 may be implemented with any number and combination of differing components as further described below with reference to the exemplary computing-based device 1000 shown in FIG. 10.

To develop the selected sensor scan schedule 106, the search manager 104 initiates the sensor scan schedule generator 102 to generate a new or modified sensor scan schedule. The sensor scan schedule generator 102 provides the future time input 222, and the target location predictions 212 are generated as the projected object states 224 which are utilized to generate the probability maps 108 for the sensor scan schedule generator 102. The sensor scan schedule generator 102 also receives the navigation data 110 inputs, as well as the sensor and ATR capabilities 112, to generate a sensor scan schedule that is provided to the search manager 104. The search manager 104 compares the generated sensor scan schedule to the sensor scan schedule evaluation criteria 114 which includes the commit logic 202. The search manager 104 can continue to task the sensor scan schedule generator 102 to modify or generate additional sensor scan schedules until the search manager 104 reaches an exit criteria which can be implemented as a threshold function of the sensor scan schedule evaluation criteria, a limit on processing time, and/or any other meaningful exit criteria.

Figure 3:
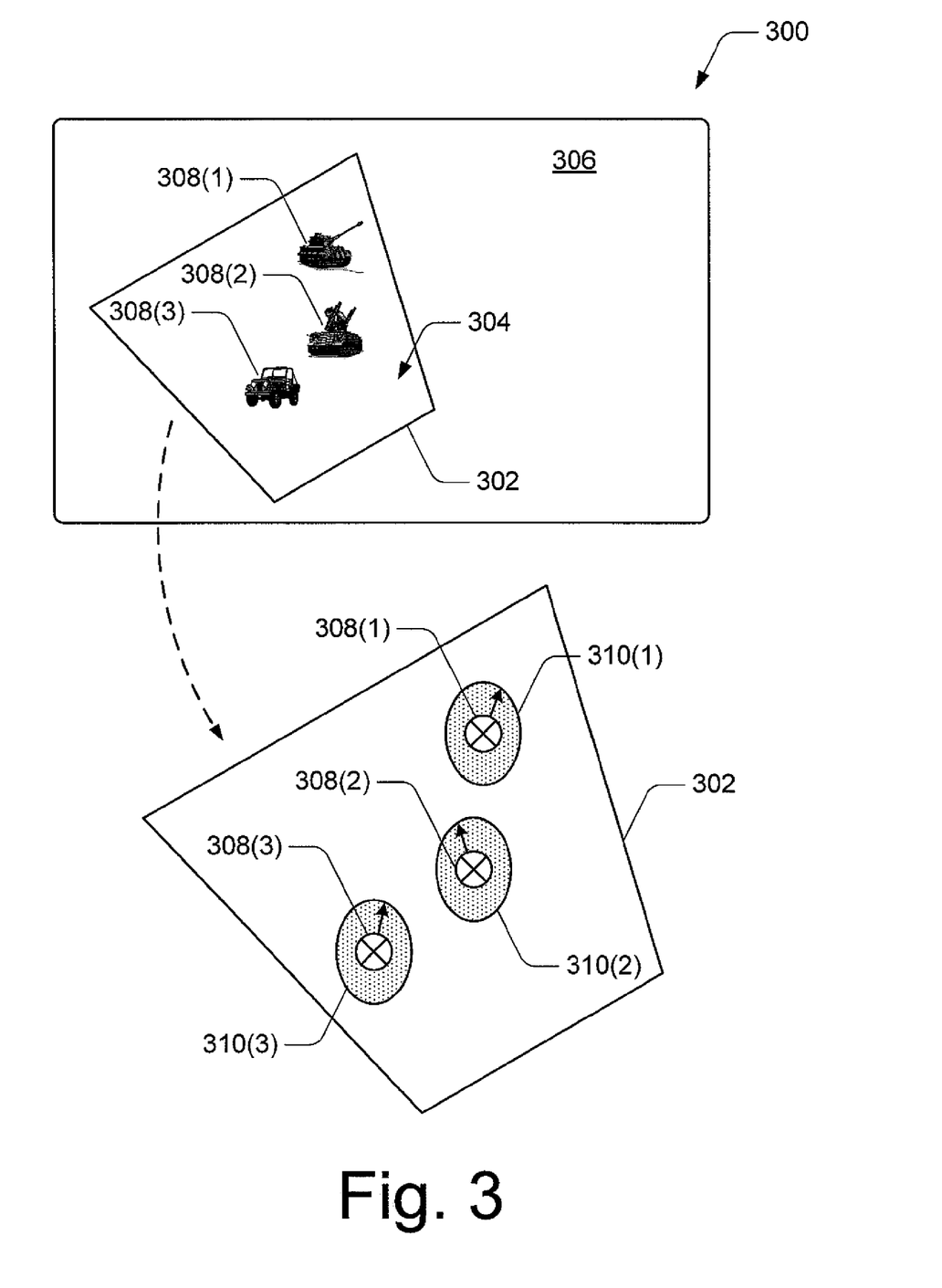
FIG. 3 illustrates an example implementation of features and/or components in the exemplary environment described with reference to FIG. 2.

FIG. 3 illustrates an example implementation 300 of the fusion track manager 204 shown in the exemplary environment 200 (FIG. 2). The fusion track manager 204 is an interface for external inputs and real-time data that are targeting inputs received as the sensor input(s) 206 and/or the data link input(s) 208. In the example implementation 300, a trapezoid represents a sensor ground coverage scan 302 of a region 304 within a target area 306, such as a visual or infra-red sensor scan. The sensor scan 302 is received by the fusion track manager 204 as an autonomous target recognition algorithm processed imaging frame and in this example, includes images of three objects 308(1-3) that are located within the scan region 304.

The fusion track manager 204 generates object probability representations from various associations and combinations of the sensor input(s) 206 and the data link input(s) 208. A sensor input 206 corresponding to an image of the sensor scan 302 includes the objects 308(1-3) and includes a likely identity of the objects, such as an indication that an object 308 is highly likely to be a first type of target and/or less likely to be a second type of target, and so on. A sensor input 206 also includes a position in latitude, longitude, and altitude of an object 308, a velocity to indicate a speed and direction if the object is moving, and an error covariance as a quality indication of the input data accuracy.

The sensor input 206 corresponding to an image of the sensor scan 302 also includes a time measurement in an absolute time coordinate, such as Greenwich mean time. The absolute time measurement also provides a basis by which to determine the current accuracy of the input as the accuracy of object positions and velocities can decay quickly over time, particularly with respect to moving military targets, or other moving objects. The sensor input 206 also includes sensor source information, such as whether the input is received from a laser targeting designator, a ground targeting system, an aircraft, or from any other types of input sources.

The fusion track manager 204 generates state estimates which includes three-dimensional position, mean, and error covariance data as well as three-dimensional velocity, mean, and error covariance data for each object 308(1-3). The three-dimensional data can be represented by latitude, longitude, and altitude, or alternatively in "x", "y", and "z" coordinates. The error covariance 310(1-3) each associated with a respective object 308(1-3) is a two-dimensional matrix containing the error variance in each axis as well as the cross terms. The error covariance pertains to the area of uncertainty in the actual position of an object 308 within the region 304 of the target area 306. The mean associated with an object 308 is the center of the uncertainty area as to where the actual position of the object is positioned (i.e., the average is the center of an "X" in a circle that represents an object 308).

A state estimate for an object 308 also includes a one-dimensional discrete identity distribution and application specific states. A one-dimensional discrete identity distribution is the likelihood that an object is a first type of target, the likelihood that the object is a second type of target, and so on. An application specific state associated with an object can include other information from which factors for targeting determinations can be made. For example, if a particular mission of a weapon system is to seek tanks, and knowing that tanks are likely to travel in a convoy, then if the objects 308(1-3) are tanks, they are likely moving together in the same direction. The state estimates for each of the objects 308 are output from the fusion track manager 204 as the estimated object states 218 shown in FIG. 2.

Figure 4:
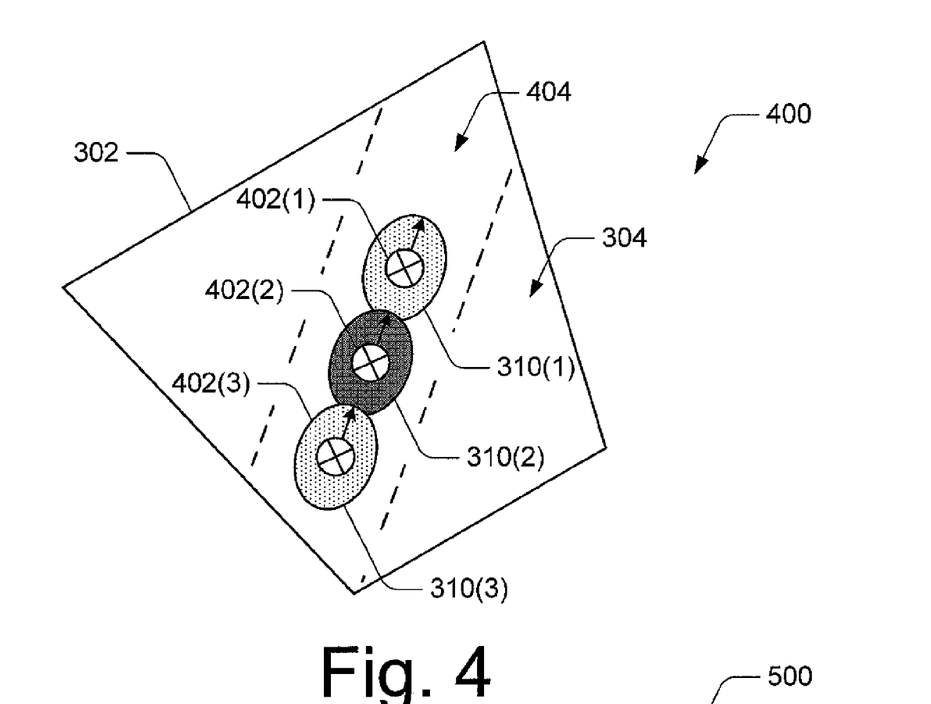
FIG. 4 illustrates an example implementation of features and/or components in the exemplary environment described with reference to FIG. 2.

FIG. 4 illustrates an example implementation of the target likelihoods 210 shown in the exemplary environment 200 (FIG. 2). The target likelihoods 210 receive the estimated object states 218 from the fusion track manager 204 and receive the target characteristics 216. The estimated object states 218 pertaining to the objects 308(1-3) described with reference to FIG. 3 are modified according to the target characteristics 216. Additionally, the objects 308(1-3) are now evaluated as possible military targets, and are identified as the targets 402(1-3) in this example implementation of the target likelihoods 210.

The target characteristics 216 can include such information about a target 402 as a likely velocity or the possible turning radius of a relocatable, moving target. Other target characteristics 216 can be utilized to determine that if a group of the targets 402(1-3) are generally traveling together and in a straight line, then the group of targets may likely be traveling on a road 404. Accordingly, the estimated object states 218 (FIG. 2) can be modified to develop and determine target likelihoods, and/or whether the targets 402(1-3) are a group traveling together, or individual targets acting independently.

Each modified object state 220 (FIG. 2) of the target likelihoods 210 is primarily a modified identity of an object 308(1-3) (FIG. 3) that was received as an estimated object state 218. A modified object state 220 still includes the three-dimensional position, velocity, and altitude of an associated target 402, as well as the modified identity of the target. In this example, target 402(2) is illustrated to represent a modified identity of the target based on its position relative to the other two targets 402(1) and 402(3), and based on the likelihood of target 402(2) moving in a group with the other two targets.

The target location predictions 212 shown in the exemplary environment 200 (FIG. 2) receive the modified object states 220 along with the future time input 222 from the sensor scan schedule generator 102 to project target locations forward to a common point in time with the generated sensor scan schedules. For example, the target location predictions 212 can be projected with a ten-second time input 222 from the sensor scan schedule generator 102 to then predict the positions of targets 402(1-3) ten-seconds into the future, such as just over a tenth of a mile along the road 404 if the targets 402(1-3) are estimated to be capable of traveling at fifty (50) mph.

Figure 5:
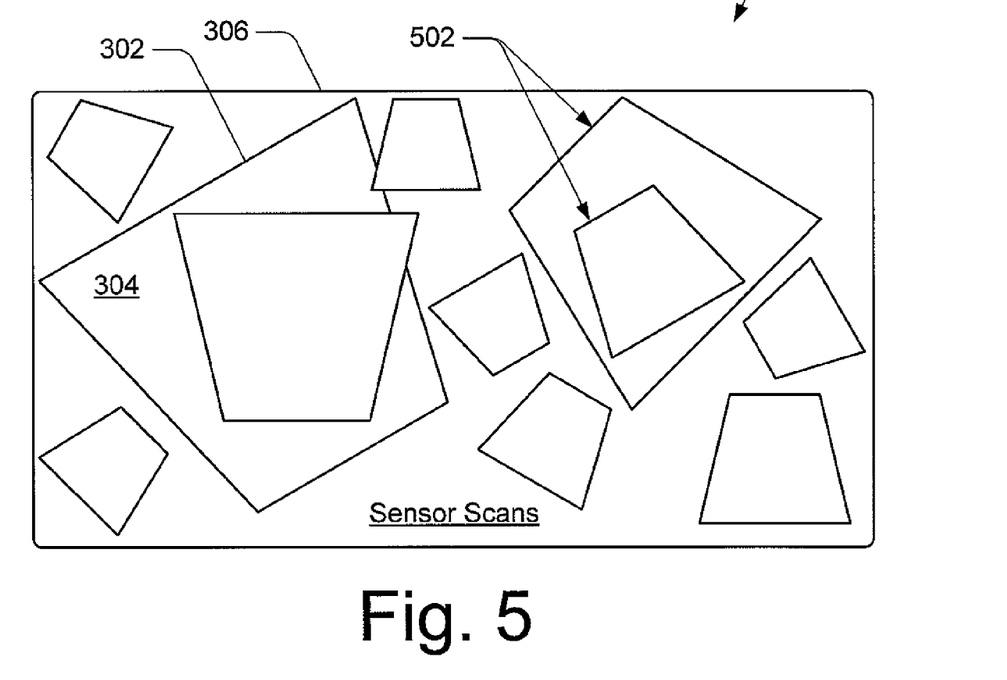
FIG. 5 illustrates an example implementation of features and/or components in the exemplary environment described with reference to FIG. 2.

FIG. 5 illustrates an example implementation 500 of the prior sensor scans database 214 shown in the exemplary environment 200 (FIG. 2). The prior scans database 214 maintains parameters from previous sensor scans 502 of various regions within the target area 306. For example, the sensor ground coverage scan 302 described with reference to FIG. 3 is illustrated as a previous sensor scan of the region 304 in the target area 306. The information associated with a previous or prior scan in the prior scans database 214 can include the type of sensor, scan pattern, direction, resolution, and scan time, as well as a position of the platform (e.g., a weapon or armament incorporating the search systems) as determined by an inertial guidance system.

Figure 6:
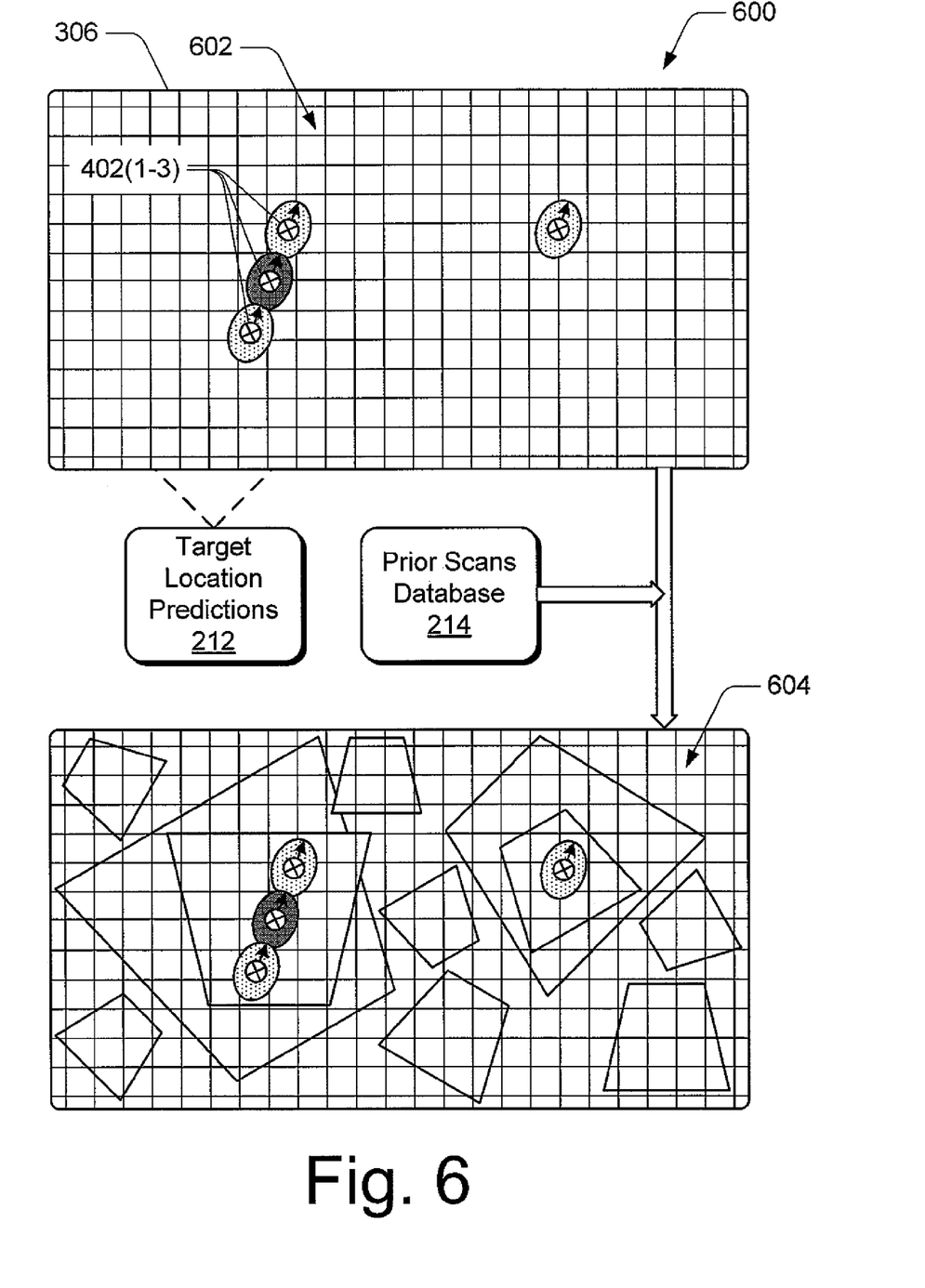
FIG. 6 illustrates an example implementation of features and/or components in the exemplary environment described with reference to FIG. 2.

FIG. 6 illustrates an example implementation 600 of the probability maps 108 shown in the exemplary environment 200 (FIG. 2), and described with reference to the sensor scan planner system 100 (FIG. 1). The probability maps 108 combine the projected object states 224 from target location predictions 212 with prior sensor scans 502 (FIG. 5) from the prior scans database 214 to determine the conditional probability of mission accomplishment. In this example, the probability maps 108 are generated from a prior scans input 502 from the prior scans database 214 combined with an input of the target location predictions 212.

In the example implementation 600, a target location prediction 212 is illustrated as a grid of normalized cells 602 over the target area 306, and 604 illustrates the target location prediction combined with the prior scans input from the prior scans database 214. The target area 306 is divided into the cells of some quantifiable unit, such as meters or angles, and the probability of a target 402(1-3) or some portion thereof corresponding to each of the cells is normalized by standard deviation.

Generally, any of the functions described herein can be implemented using software, firmware (e.g., fixed logic circuitry), hardware, manual processing, or a combination of these implementations. A software implementation represents program code that performs specified tasks when executed on processor(s) (e.g., any of microprocessors, controllers, and the like). The program code can be stored in one or more computer readable memory devices, examples of which are described with reference to the exemplary computing-based device 1000 shown in FIG. 10. Further, the features of sensor scan planner as described herein are platform-independent such that the techniques may be implemented on a variety of commercial computing platforms having a variety of processors.

Methods for sensor scan planner, such as exemplary methods 700 and 800 described with reference to respective FIGS. 7 and 8, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 7:
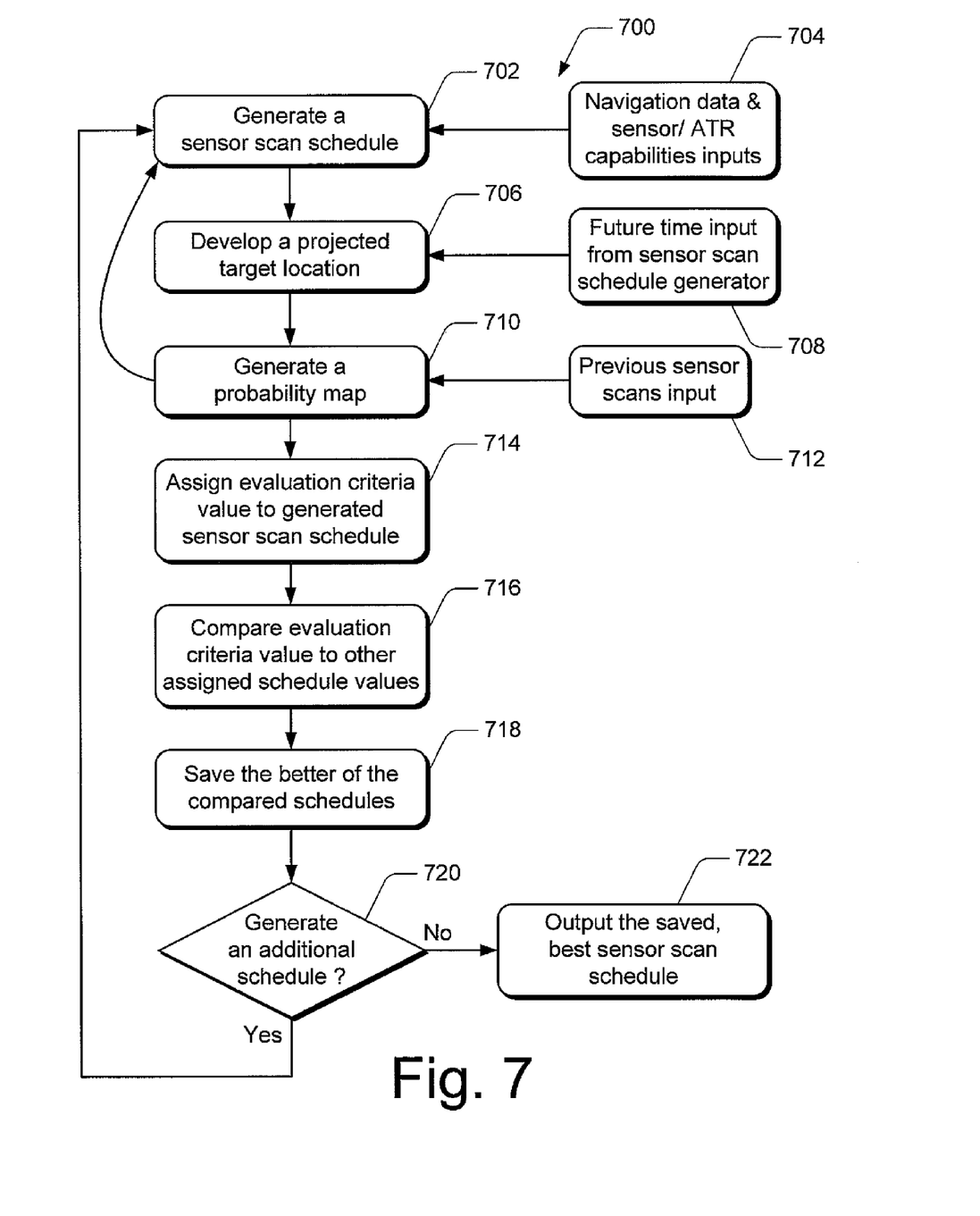
FIG. 7 illustrates exemplary method(s) implemented by the search manager in an embodiment of sensor scan planner.

FIG. 7 illustrates an exemplary method 700 for sensor scan planner and is described with reference to the search manager 104 and the sensor scan schedule generator 102 shown in FIGS. 1 and 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 702, a sensor scan schedule is generated to optimize the scan schedules of multiple sensors. For example, the search manager 104 initiates the sensor scan schedule generator 102 to generate or modify a sensor scan schedule, where the sensor scan schedule is generated based at least in part on a probability map 108 (from block 710), on the navigation data 110, and/or based on the sensor and ATR capabilities 112 (inputs at 704). In an embodiment, the sensor scan schedule can be generated to optimize the scan schedules of multiple, various sensors on an airborne platform or weapon system to search and locate relocatable target(s). The generation of a sensor scan schedule by the sensor scan schedule generator 102 is described in more detail with reference to FIGS. 8A-8B.

At block 706, a projected target location is developed based on target characteristics combined with a previously known target location projected into the future by a future time input from the sensor scan schedule generator (at block 708). For example, a targeting input is received as a sensor scan input 206 and/or as a data link input 208, and the modified object states 220 are developed as the target location predictions 212 (i.e., "projected target locations").

At block 710, a probability map is generated from previous sensor scans combined with a projected target location of one or more relocatable targets in a target area. For example, a probability map 108 is generated at least in part from previous sensor scans (input at block 712) combined with the projected object states 224 developed at block 706.

At block 714, a generated sensor scan schedule is assigned an evaluation criteria value. The evaluation criteria value can include, or take into consideration, the performance of the sensors, the performance of autonomous target recognition algorithms, and/or the commit logic 202 for an airborne platform or weapon system.

At block 716, the evaluation criteria value of the generated sensor scan schedule is compared to other evaluation criteria values corresponding to respective previously generated sensor scan schedules to determine an optimal sensor scan schedule (e.g., which sensor scan schedule best satisfies the sensor scan schedule evaluation criteria). The sensor scan schedule evaluation criteria can be any meaningful metric related to the conditional probability of mission accomplishment given the generated sensor scan schedule, the sensor and ATR capabilities 112, and/or the commit logic 202. At block 718, the better of two compared sensor scan schedules (based on the respective evaluation criteria values) is saved to be output as the selected sensor scan schedule 106, or to be subsequently compared to additional generated sensor scan schedules.

Other sensor scan schedule evaluation criteria 114 that may be utilized by the search manager 104 to evaluate a generated sensor scan schedule is an ATR algorithm dependency factor which indicates the statistical dependency of ATR results produced from sensor scans of the same area which are close in time, have similar relative geometries, were produced by different sensors, or were produced by different ATR algorithms. Other evaluation criteria 114 may also include such information as the sensor scan modes, to include indications of low or high resolution scans, wide or narrow field of views, long or short range scans, and other various sensor modality information. In addition, the search manager 104 may include such data as the platform velocity vector which can be obtained or received as the navigation data 110.

At block 720, a determination is made as to whether an additional sensor scan schedule is to be generated. For example, the search manager 104 can determine whether to generate additional sensor scan schedules and assign additional evaluation criteria values for comparison to determine the optimal sensor scan schedule, or the search manager 104 can otherwise reach an exit criteria such as a threshold function of the sensor scan schedule evaluation criteria, a limit on processing time, or any other meaningful exit criteria. If an additional sensor scan schedule is not generated (i.e., "no" from block 720), then the saved, best sensor scan schedule is output at block 722 as the selected sensor scan schedule 106. If an additional sensor scan schedule is to be generated (i.e., "yes" from block 720), then the method 700 continues at block 702 to repeat the process.

Figure 8A:
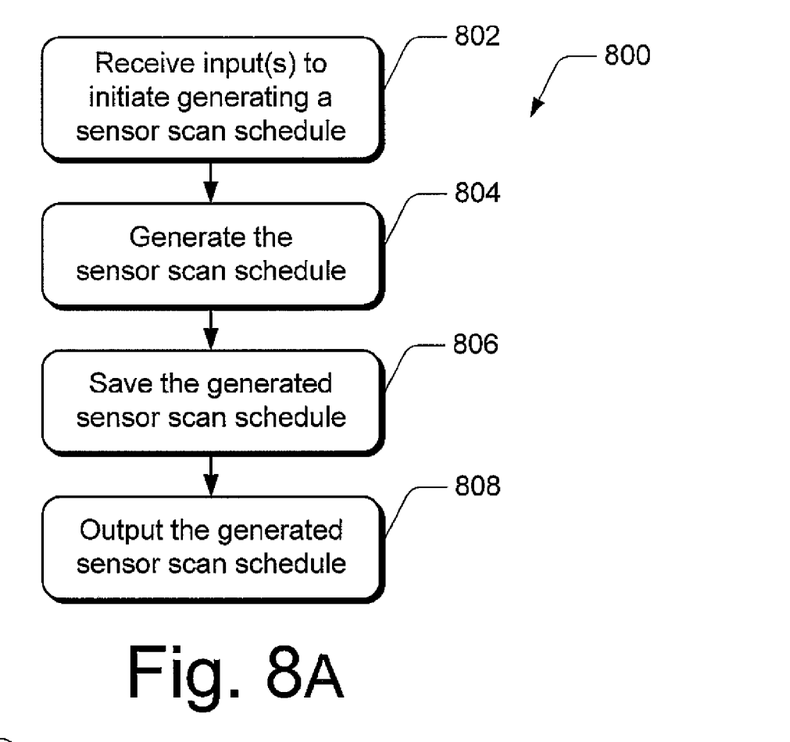
FIGS. 8A-8B illustrate exemplary method(s) implemented by the sensor scan schedule generator in an embodiment of sensor scan planner.
Figure 8B:
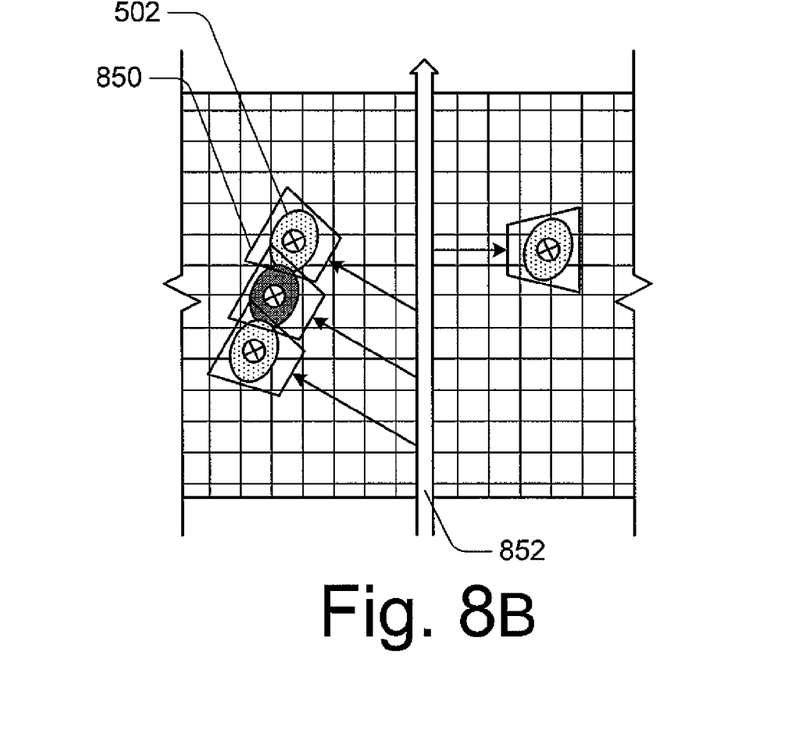

FIGS. 8A and 8B illustrate an exemplary method 800 for sensor scan planner and is described with reference to the sensor scan schedule generator 102 shown in FIGS. 1 and 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 802, inputs are received to initiate generating a sensor scan schedule and, at block 804, the sensor scan schedule is generated. For example, the sensor scan schedule generator 102 receives any one or combination of probability maps 108, navigation data 110, and sensor and ATR capabilities 112 when the search manager 104 initiates the sensor scan schedule generator 102 to generate or modify a sensor scan schedule. At block 806, the generated sensor scan schedule is saved and, at block 808, the generated sensor scan schedule is output. For example, the sensor scan schedule generator 102 initiates that the generated sensor scan schedule be maintained, and outputs the generated sensor scan schedule to the search manager 104 for evaluation against the sensor scan schedule evaluation criteria 114.

A sensor scan schedule is generated to project sensor scans 850 (FIG. 5B) of the targets 402 along a current platform velocity vector 852, such as for an airborne platform or weapon system that is already flying and enroute or entered into a target area. Upon receiving a synchronization event from a larger, controlling system, an updated or additional sensor scan schedule can be generated based on updated route information. In this embodiment, a sensor scan schedule is generated along the current velocity vector 852 of the platform such that the sensor scan schedule can be generated ahead of, or independently from, a generated route or flight path of the airborne platform or weapon system. In an alternate embodiment, a sensor scan schedule can be generated in the context of a planned, generated route or flight path.

Figure 9:
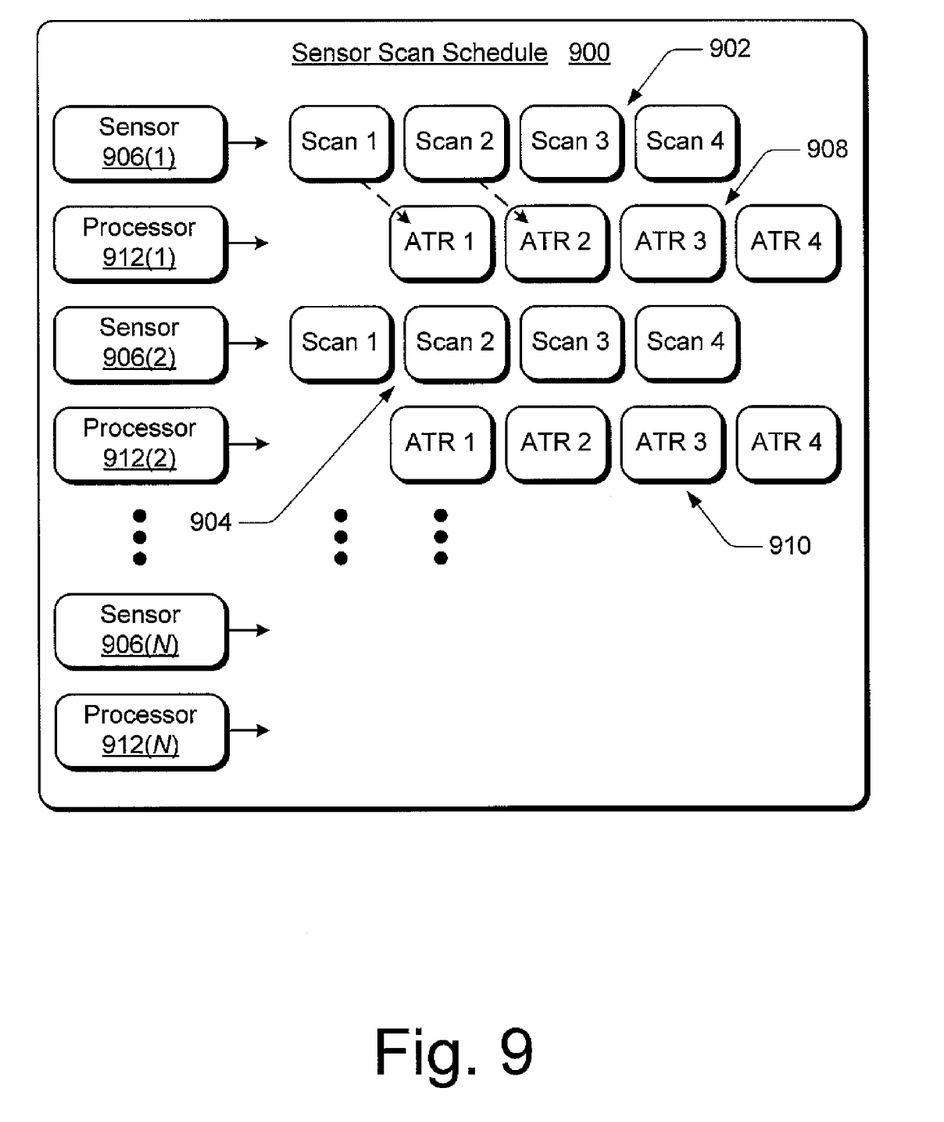
FIG. 9 illustrates an exemplary sensor scan schedule generated by the sensor scan schedule generator in an embodiment of sensor scan planner.

FIG. 9 illustrates an exemplary sensor scan schedule 900 in an embodiment of sensor scan planner. In this example, the sensor scan schedule 900 schedules the scan patterns 902, 904 for one or more sensors 906(1-N) (although only schedules for sensors 906(1-2) are shown), and schedules corresponding to autonomous target recognition algorithms processing 908, 910 for one or more processors 912(1-N) (although only schedules for processors 912(1-2) are shown). The sensor scan schedule 900 correlates sensor scans 902 with algorithm processing 908 to coordinate the resources such that a sensor scan 902 (scan 1) can be processed by the processor 912(1) running an autonomous target recognition algorithm 908 (ATR 1). The sensor 906(1) can then reposition such that a sensor scan 902 (scan 2) can be processed by the processor 912(1) running the autonomous target recognition algorithm 908 (ATR 2), and so on for each coordinated sensor-processor mode.

Figure 10:
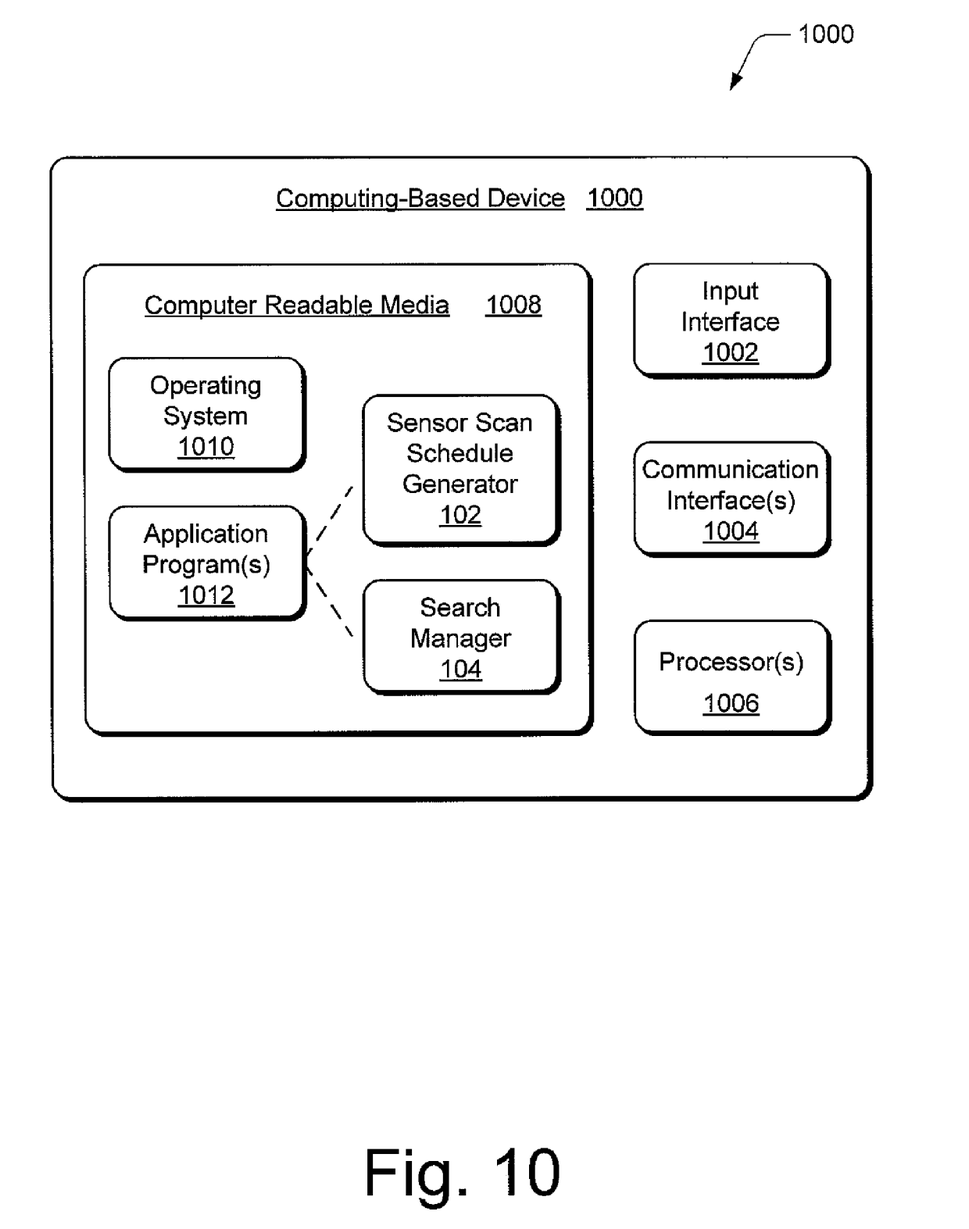
FIG. 10 illustrates various components of an exemplary computing-based device in which embodiments of sensor scan planner can be implemented.

FIG. 10 illustrates various components of an exemplary computing-based device 1000 which can be implemented as any form of computing or electronic device in which embodiments of sensor scan planner can be implemented. For example, the computing-based device 1000 can be implemented to include any one or combination of components described with reference to the sensor scan planner system 100 (FIG. 1) or the exemplary environment 200 (FIG. 2).

The computing-based device 1000 includes an input interface 1002 by which the sensor input(s) 206, the data link input(s) 208, and any other type of data inputs can be received. Device 1000 further includes communication interface(s) 1004 which can be implemented as any one or more of a serial and/or parallel interface, a wireless interface, any type of network interface, and as any other type of communication interface.

The computing-based device 1000 also includes one or more processors 1006 (e.g., any of microprocessors, controllers, and the like) which process various computer executable instructions to control the operation of computing-based device 1000, to communicate with other electronic and computing devices, and to implement embodiments of sensor scan planner. Computing-based device 1000 can also be implemented with computer readable media 1008, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 1008 provides data storage mechanisms to store various information and/or data such as software applications and any other types of information and data related to operational aspects of computing-based device 1000. For example, an operating system 1010 and/or other application programs 1012 can be maintained as software applications with the computer readable media 1008 and executed on processor(s) 1006 to implement embodiments of sensor scan planner. For example, the sensor scan schedule generator 102 and the search manager 104 can each be implemented as a software application component.

In addition, although the sensor scan schedule generator 102 and the search manager 104 can each be implemented as separate application components, each of the components can themselves be implemented as several component modules or applications distributed to each perform one or more functions in a sensor scan planner system. Further, each of the sensor scan schedule generator 102 and the search manager 104 can be implemented together as a single application program in an alternate embodiment.

Although embodiments of sensor scan planner have been described in language specific to structural features and/or methods, it is to be understood that the subject of the appended claims is not necessarily limited to the specific features or methods described. Rather, the specific features and methods are disclosed as exemplary implementations of sensor scan planner.

The invention claimed is:

1. A method for a vehicle utilizing multiple onboard sensors during a mission, the method comprising using a computer to:
   generate a plurality of sensor scan schedules that a vehicle could utilize during the mission, each sensor scan schedule correlating scans of the multiple sensors to different autonomous target recognition algorithm processors;
   compare each generated sensor scan schedule to evaluation criteria to determine a contribution towards mission accomplishment that would result from using the that scan schedule along the vehicle's velocity vector each whether the generated schedule is optimal, the evaluation criteria value corresponding to respective previously generated sensor scan schedules; and
   use the comparisons to determine a sensor scan schedule that results in a larger contribution toward mission accomplishment.

2. A method as recited in claim 1, wherein each comparison includes determining whether the generated sensor scan schedule meets a conditional probability threshold based on the evaluation criteria.

3. A method as recited in claim 2, wherein the evaluation criteria determines a contribution towards mission accomplishment that would also result from commit logic that indicates mission specific criteria which determine whether the vehicle can commit to a particular object including the likelihood the vehicle can reach an object, the likelihood an object is of a mission desired type, and the likelihood the object is the mission desired object.

4. A method as recited in claim 1, wherein accomplishing the mission includes searching, recognizing, and committing to targets in a region; and wherein the evaluation criteria includes representations of targets in the region.

5. A method as recited in claim 1, wherein the evaluation criteria determines a contribution towards mission accomplishment that would also result from sensor and autonomous target recognition algorithm probability model processing where a sensor and autonomous target recognition algorithm probability model characterizes predicted object recognition performance and resource allocation for each combination of sensor mode and autonomous target recognition algorithm combination.

6. A method as recited in claim 1, further comprising generating a probability map from previous sensor scans combined with a projected target location of one or more relocatable targets in a target area, and wherein each sensor scan schedule is generated based at least in part on the probability map.

7. A method as recited in claim 6, further comprising:
   receiving a targeting input as at least one of a sensor scan input; a data link input;
   generating estimated object states from the inputs;
   determining a previously known target location of one or more relocatable targets from the targeting input;
   projecting object states from the predicted object states and target locations; and
   combining the projected object states with prior sensor scans to determine a conditional probability towards mission accomplishment.

8. A sensor scan planner system, comprising:
   a sensor scan schedule generator for generating a plurality of sensor scan schedules that a vehicle can utilize during a mission, each scan schedule correlating scans of multiple sensors based with different algorithm processing;
   sensor scan schedule evaluation criteria for determining a contribution towards mission accomplishment that would result from using each scan schedule along the vehicle's velocity vector; and
   a search manager for using the evaluation criteria to guide the schedule generator to produce the sensor scan schedule that results in a larger contribution toward mission accomplishment.

9. A sensor scan planner system as recited in claim 8, wherein the vehicle is an airborne platform, and wherein the sensor scan schedule generator generates the plurality of scan schedules along a current velocity vector of the airborne platform to search and locate at least one relocatable target.

10. A sensor scan planner system as recited in claim 8, wherein accomplishing the mission includes searching, recognizing, and committing to targets in a region; and wherein the evaluation criteria includes representations of targets in the region.

11. A sensor scan planner system as recited in claim 10, further comprising a commit logic module containing a set of mission specific criteria which determine whether the vehicle can commit to a particular target, wherein the evaluation criteria determines a contribution towards mission accomplishment that would also result from the commit logic indicating whether to commit to the target.

12. A sensor scan planner system as recited in claim 8, further comprising:
 a fusion track manager configured to receive sensor scan and data link inputs, and generate estimated object states from the inputs.

13. A sensor scan planner system as recited in claim 12, wherein the evaluation criteria characterizes information from new sensor scans based on the information already gained from previous sensor scans, including projecting object states from the estimated object states and combining the projected object states with prior sensor scans to determine a conditional probability towards mission accomplishment.

14. A sensor scan planner system as recited in claim 13, further comprising a probability map generated at least in part from previous sensor scans and the projected object states of one or more relocatable targets in a target area, and wherein the sensor scan schedule is generated based at least in part on the probability map.

15. A sensor scan planner system as recited in claim 14, wherein the sensor scan schedule generator is further configured to generate a future time input to develop a projected target location from which the probability map is at least in part generated, the projected target location being based on target characteristics combined with a previously known target location projected into the future by the fixture time input.

16. An article comprising computer readable media encoded with computer executable instructions that, when executed, direct a computing-based system of an airborne platform to:

generate a plurality of sensor scan schedules that the airborne platform could utilize during a mission, each sensor scan schedule correlating scans of multiple sensors for the airborne platform to autonomous target recognition processing;

compare each generated sensor scan schedule to evaluation criteria to determine a contribution towards mission accomplishment that would result from using the that scan schedule along the platform's velocity vector each whether the generated schedule is optimal, the evaluation criteria value corresponding to respective previously generated sensor scan schedules; and use the comparisons to determine a sensor scan schedule that results in a larger contribution toward mission accomplishment.

17. The method of claim 1, wherein sensor and ATR performance model inputs are used to define optimal capabilities of each sensor and autonomous target recognition algorithm, wherein the sensor scan schedule generator uses these inputs to determine which combination of sensors and multiple processors for the autonomous target recognition algorithms, as well as which sequence of sensor scans, provide an optimization for the greatest likelihood of target detection.

18. The method of claim 1, wherein each sensor scan schedule of the plurality is assigned an evaluation criteria value; and wherein the evaluation criteria value of the last-generated sensor scan schedule is compared to other evaluation criteria values of previously generated sensor scan schedules to determine an optimal sensor scan schedule.

19. The method of claim 18, wherein the evaluation criteria includes an ATR algorithm dependency factor which indicates the statistical dependency of ATR results produced from sensor scans of the same area which are close in time, have similar relative geometries, were produced by different sensors, or were produced by different ATR algorithms.

20. The method of claim 6, wherein information associated with a previous sensor scan includes a type of sensor, scan pattern, direction, resolution, and scan time, and a position of the vehicle as determined by an inertial guidance system.

* * * * *